(12) United States Patent
Herget

(10) Patent No.: US 7,193,934 B2
(45) Date of Patent: Mar. 20, 2007

(54) DOMAIN POSITION DETECTION MAGNETIC AMPLIFYING MAGNETO-OPTICAL SYSTEM

(75) Inventor: Philipp Herget, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 791 days.

(21) Appl. No.: 10/165,438

(22) Filed: Jun. 7, 2002

(65) Prior Publication Data
US 2003/0227831 A1    Dec. 11, 2003

(51) Int. Cl.
*G11B 11/00* (2006.01)
(52) U.S. Cl. .................... 369/13.54; 369/13.06
(58) Field of Classification Search ............ None
See application file for complete search history.

(56) References Cited

U.S. PATENT DOCUMENTS

| | | | |
|---|---|---|---|
| 6,141,297 A | 10/2000 | Kim | |
| 6,226,234 B1 | 5/2001 | Ohnuki et al. | |
| 6,385,140 B2 | 5/2002 | Ohnuki et al. | |
| 6,385,141 B1 * | 5/2002 | Tani et al. ............ | 369/13.54 |
| 6,388,954 B1 * | 5/2002 | Awano et al. ......... | 369/13.02 |

FOREIGN PATENT DOCUMENTS

| JP | 08007388 A | 12/2001 |
|---|---|---|
| JP | 1996007388 A | 12/2001 |
| JP | 2001006232 A | 12/2001 |

OTHER PUBLICATIONS

MAMMOS Technology Delivers 20 Times the Storage Capacity of CD-ROM, Hitachi Maxell, Ltd., Oct. 28, 1996 http://minidisc.amulation.com/keep/mammos-e.html.
Asymmetric Run Length Constraints for Increased Resolution and Power Margin in MAMMOS Readout, C.A. Verschuren, H.W. wan Kesteren Philips Research, Prof. Holstlaan 4, 5656 AA Eindhoven, The Netherlands Mar. 31, 2002.
Signal Processing for the MAMMOS Channel, A.H.J. Immink, M.W. Blum, C.A. Verschuren, H.W. van Kesteren. Philips Research, Prof. Holstlaan 4, 5656 AA Eindhoven, The Netherlands. MORIS 2002 Conference Digest, Paper, We-M2, p. 201-2, May 5, 2002.

* cited by examiner

*Primary Examiner*—Tan Dinh
(74) *Attorney, Agent, or Firm*—Edward L. Pencoske; Jones Day

(57) ABSTRACT

The present invention is a method of reading and writing in MAMMOS that uses the edge of the thermal profile for detection of a domain rather than using the tip of the profile. By using the edge, it is possible to detect the position of domains rather than merely the presence of domains. Thus, domain positions are used to store data. By measuring these positions relative to the last domain, more accuracy can be gained. The new scheme is called Domain Position Detection for MAMMOS (DPD-MAMMOS). In DPD-MAMMOS, the information is encoded into the MAMMOS media in the form of the position of the domains rather than the presence of the domains. In this way, each domain stored in the media can contain several bits or possibly bytes of information. Methods of reading and writing information are disclosed.

14 Claims, 6 Drawing Sheets

DOMAIN POSITION DETECTION MAGNETIC AMPLIFYING MAGNETO-OPTICAL SYSTEM

BACKGROUND

1. Field of the Invention

The present invention is related to Magnetic Amplifying Magneto-Optical Systems (MAMMOS).

2. Description of the Background

Magnetic Amplifying Magneto-Optical System (MAMMOS) is a relatively new Magneto-Optical (MO) readout technique proposed by Hitachi-Maxell which may be used to push optical data storage densities to 100 Gb/in$^2$ and beyond. The media consists of two layers of magnetic material as shown in FIG. 1. The bottom (storage) layer is used to store information. The top (readout) layer is used to readout information. In MAMMOS, the optical read back signal is amplified by expanding the magnetic domains in the readout layer to fill or partially fill the laser spot. A non-magnetic layer, used to provide isolation, separates the two layers. FIG. 1 depicts the magnetic structure along with the external stimulus. The compositions of the storage layer and readout layer are chosen such that a laser heating the media causes a decrease in the coercivity of the readout layer. That decrease is sufficiently large such that the combination of an external field and the stray field from a domain in the storage layer is enough to overcome the coercivity and nucleate a domain in the readout layer. Using this method, when a domain is present in the storage layer, it can be duplicated and expanded in the readout layer.

To write to the medium, a laser is focused onto the surface to heat the media and reduce the coercivity of both layers locally. An external field is then applied, and the magnetization of the storage layer is switched into the direction of the external field in the locations where the field exceeds the coercivity.

During readout, the same laser beam is used, but the laser power is reduced to a level that will not alter the storage layer. Readout is accomplished by utilizing the polar Kerr effect. This effect causes the polarization of the reflected beam to be altered by the magnetization of the surface from which it is reflecting, in this case, the readout layer. By adjusting the readout layer properties appropriately, the readout layer can be used as a mask to select bits that are smaller than the laser spot from the storage layer.

When the laser beam heats the readout layer, the coercivity drops locally resulting in a coercivity profile with a minimum at the laser location. As mentioned, the magnetic properties of the two layers are adjusted so that when an external field is added to the field created by the data in the storage layer, the combined field is slightly larger than the coercivity of the readout layer at its lowest point. In FIG. 2, the lower curve is a plot of the fields inside the readout layer down the center of the track created by the data in the storage layer. The upper curve represents the coercivity of the readout layer after heating by the laser beam, also down the center of the track.

FIGS. 3A–3C illustrate the coercivity profile and the external plus stray fields at consecutive points in time during a MAMMOS data readout process. To readout data, an external field is applied at the frequency of the passing data recorded in the storage layer. Thus, as the coercivity profile moves across the bits in the storage layer, the total external field will reverse sign with position of the laser. The laser power and external field are adjusted such that the sum of the external field and stray field from the storage layer causes a domain to nucleate in the readout layer when a domain is present in the storage layer. In the case where no domain is present in the storage layer, these fields are insufficient to nucleate a domain in the readout layer. In typical MAMMOS, each of the domains in the storage layer represents a bit of data.

In FIG. 3A, the media is being probed for information in the storage layer at a location with no domain. In the figure, the external field has been switched positive at a bit location. Because there is no domain, there is no intersection between the two curves, nucleation cannot occur in the readout layer, and there is no change in the readout signal. After probing at this location, the external field is reversed or turned off as the laser moves toward the next bit location as depicted in FIG. 3B. When the laser arrives at the next bit location, the external field is turned on again to test for a domain as shown in FIG. 3C. In that case, there is a domain present in the storage layer. As shown in the figure, the two curves overlap, causing a domain to nucleate in the readout layer where the sum of the external and stray fields is larger than the readout coercivity.

Once a domain is nucleated in the MAMMOS media, it is immediately expanded due to forces on the domain wall. The domain expands to a size that fills most or all of the laser spot, resulting in a large readout signal. After passing over the domain, the field is reversed again, collapsing the domain in the readout layer and lowering the readout signal. If no domain has been recorded, the direction of magnetization of the storage layer is the same as the readout layer, no domain will be nucleated in the readout layer, and no MAMMOS signal will be detected.

The readout signal in MAMMOS is essentially digital, going 'high' at each potential bit location only if there was a domain present in the storage layer. FIG. 4 shows the external field and expected readout signal along with the data stored in the storage layer. At each bit location, the field is increased, and a high readout signal is expected to occur each time a domain was recorded.

The resolution limit to MAMMOS is set by the width of the tip of the thermal profile used as the detector as well as the method by which the data was recorded. In the ideal case, there is no noise in the system, media properties are constant, and there are no variations in laser power, focus, etc. In that case, the size of the tip used for readout can be made infinitely small. In reality, all of the above factors will limit how low the threshold can be set, and thus the resolution of the system. In addition, when pseudo-random data is written, neighboring domains in the storage layer will cause the maximum amplitude of the field in the readout layer created by a domain in the storage layer to shift. These shifts in amplitude limit the height and thus the width of the thermal profile that is needed for detection.

To achieve a smaller thermal profile, and thus a higher resolution, it is important to have good control over the laser power, have a small laser spot, have a uniform medium, and accurate focus. To further increase resolution, researchers have attempted to make the thermal profile steeper by adding heat sink layers into the medium. This will work to some degree to increase the resolution of MAMMOS. Another approach is to decrease the size of the domains in the storage layer. This has the effect of making the width of the stray field from the storage layer smaller and decreasing the neighborhood effect by moving domains in the storage layer further apart, thus increasing the capacity of the system. Using some of these techniques, Hitachi-Maxell has achieved information storage with a bit spacing of about 100 nm.

The need exists for a MAMMOS that has a large storage capacity and is independent of fluctuations in laser power, media, and the like.

SUMMARY OF THE INVENTION

One aspect of the present invention is to use the edge of the thermal profile for detection of a domain rather than using the tip of the profile. By using the edge, it is possible to detect the position of the domains rather than merely the presence of the domains. Thus, domain positions are used to store data. By measuring these positions relative to the last domain, more accuracy can be gained. The new scheme is called Domain Position Detection MAMMOS (DPD-MAMMOS). In DPD-MAMMOS, the information is encoded into the MAMMOS media in the form of the position of the domains rather than the presence of the domains. In this way, each domain stored in the media can contain several bits or possibly bytes of information. The technique requires changes primarily in the write and readout strategies of current techniques.

Because DPD-MAMMOS utilizes the edge of the thermal profile for detection rather than the peak, DPD-MAMMOS has the potential for delivering a higher storage density, wider power margins, and a resistance to slow variations in media properties, which are problems in traditional MAMMOS. DPD-MAMMOS requires a minimal change to the current MAMMOS configurations to implement, and eliminates the clock recovery issues of current MAMMOS. Finally, DPD-MAMMOS has the potential for increased densities as the disk data rates increase. Those advantages and benefits, and others, will become apparent from the Description of the Preferred Embodiments herein below.

BRIEF DESCRIPTION OF THE DRAWINGS

For the present invention to be easily understood and readily practiced, the present invention will now be described in conjunction with preferred embodiments, for purposes of illustration and not limitation, in which.

DESCRIPTION OF THE PREFERRED EMBODIMENTS

Figure 1:
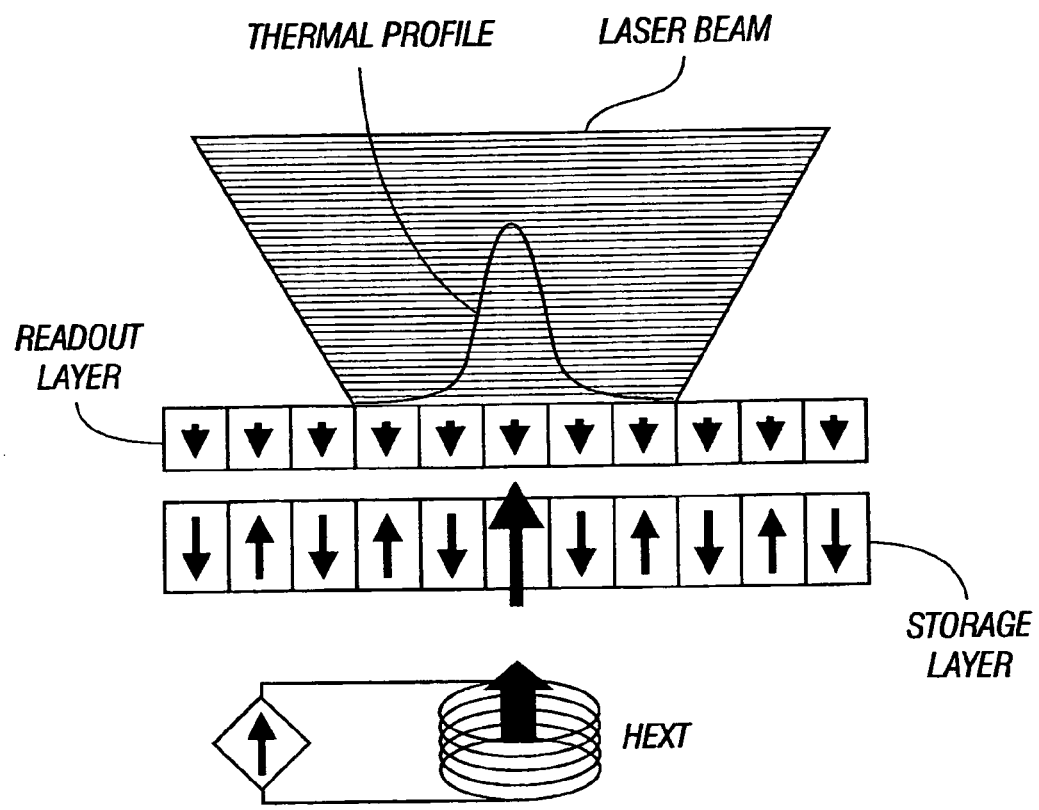
FIG. 1 is a schematic representation of a MAMMOS media structure and external stimulus.
Figure 2:
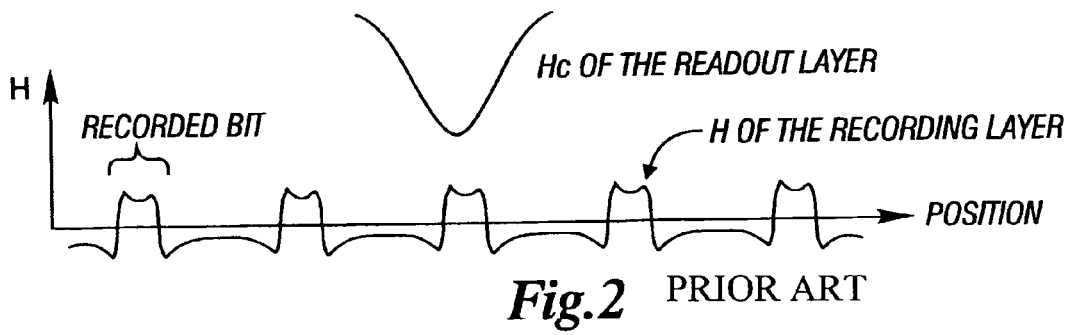
FIG. 2 is a graph of the coercivity profile and magnetic fields versus position of the system of FIG. 1.
Figure 3A:
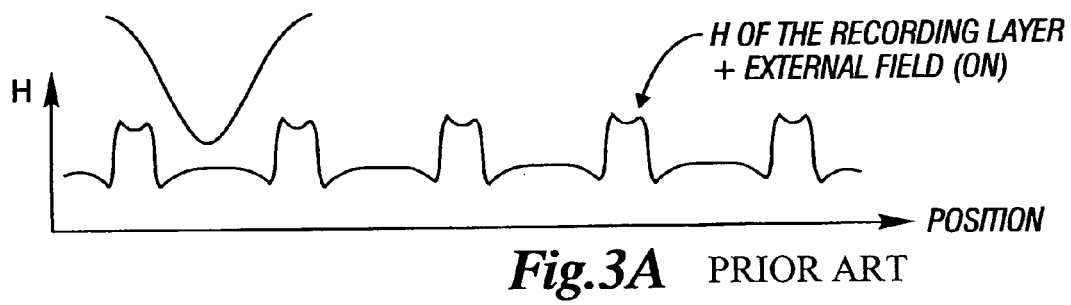
FIGS. 3A–3C illustrate the coercivity profile and external field plus stray (readout) field as a function of position at three different times.
Figure 3B:
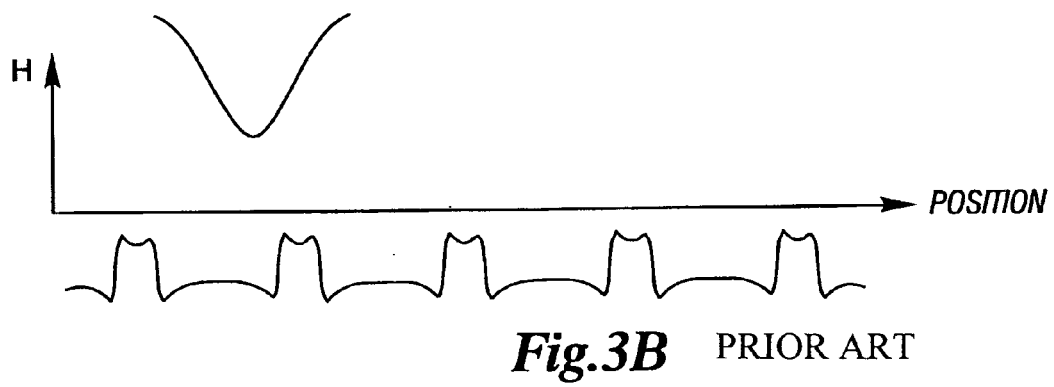
Figure 3C:
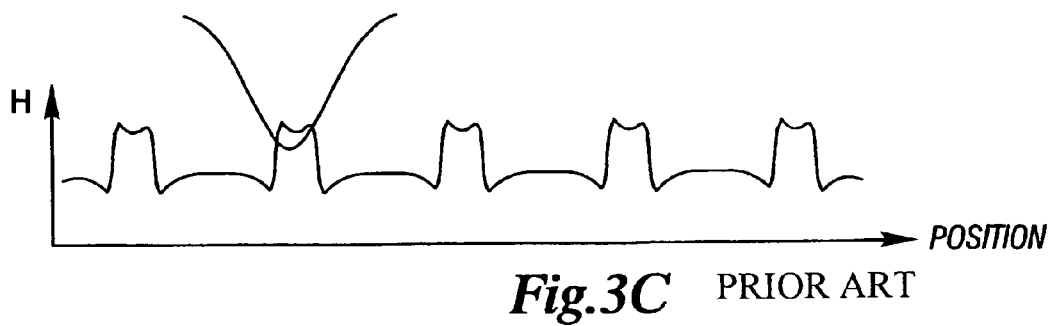
Figure 4:
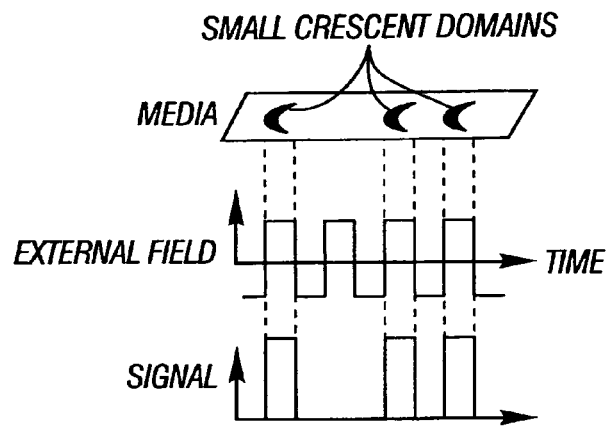
FIG. 4 illustrates MAMMOS signals relative to information in the media.
Figure 5:
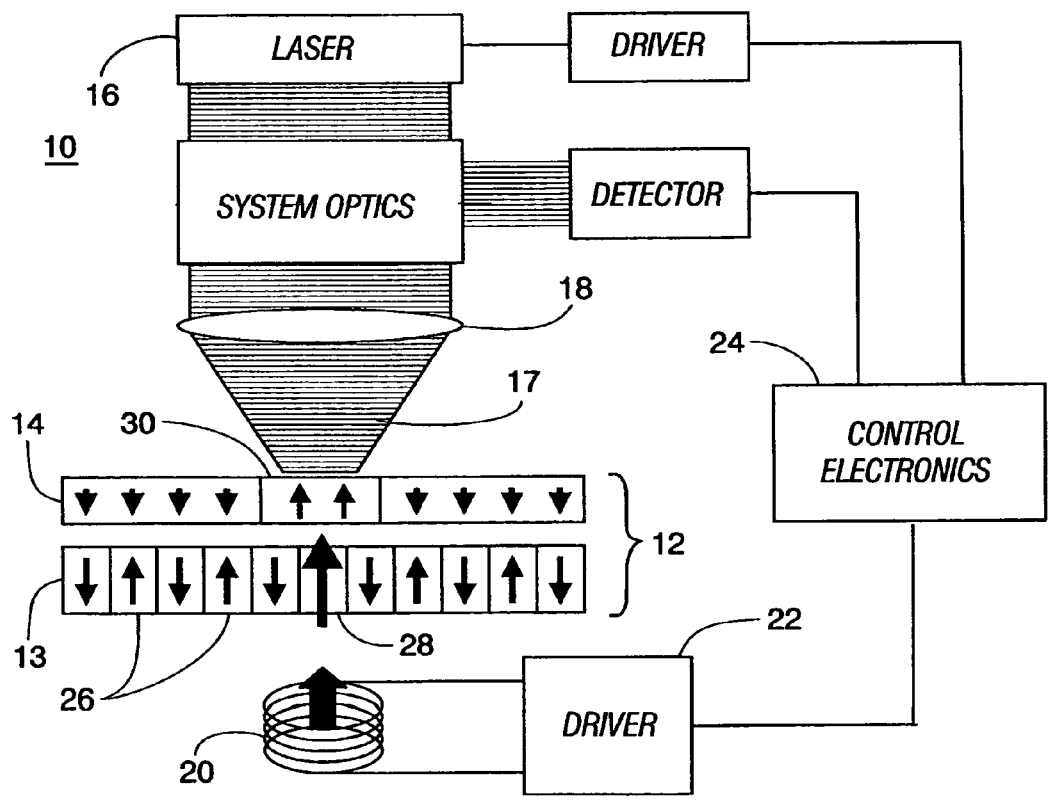
FIG. 5 is a schematic representation of a device for storing and reading information according to the present invention.

FIG. 5 is a schematic representation of a device 10 for storing and reading information in a MAMMOS type medium 12. The MAMMOS type medium 12 is comprised of a storage layer 13 and a readout layer 14. The storage layer 13 may be comprised of, for example, an alloy of Terbium, Iron and Cobalt. The readout layer 14 may be comprised of, for example, an alloy of Gadolinium, Iron and Cobalt. Other types of media are known. For example, see U.S. Pat. No. 6,141,297 entitled "Magneto-Optical Recording Medium." As used herein, the phrase "MAMMOS type media" refers to any media in which a readout or amplifying layer is positioned above (or below) a storage or recording layer and wherein the readout or amplifying layer has the characteristics of copying the magnetic domain of the storage or recording layer when the readout or amplifying layer is heated.

A laser 16 produces a beam 17 which is focused through appropriate optics, such as lens 18, onto the medium 12. The laser 16 may produce a beam 17 of a predetermined wavelength as is known in the art. The medium 12 is capable of moving relative to the laser beam 17 in a known manner (not shown) such that the beam is brought into contact with different points on the medium 12. Other sources of heat may be employed.

A coil 20, energized by an excitation source or driver 22 provides the external magnetic field. Both the laser 16 and the excitation source 22, as well as the means for moving the media (not shown), are controlled by control electronics 24 so as to perform read and write operations with respect to medium 12. In FIG. 5, medium 12 is shown having a plurality of magnetic domains 26. One of the domains, domain 28, has been copied and expanded in the readout layer 14 as shown by numeral 30.

Figure 6:
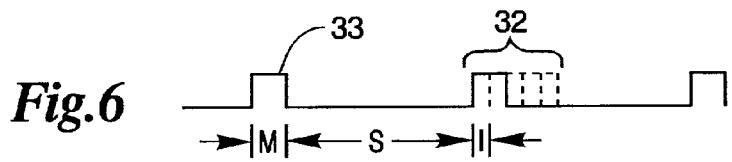
FIG. 6 illustrates how position information may be used to store information.

Beginning with a medium 12 in which the magnetic orientation of the storage layer is uniform, positions on the media are selected at which the magnetic orientation is modified to store data. One scheme for storing data is shown in FIG. 6. The data is stored, or represented by, the position of the domain 32 with respect to domain 33. The length of each written domain is M. This is followed by a space of length S, which will determine the power margins of the system and which part of the coercivity profile will collide with the next domain. Finally, the symbols of data are encoded as position information, so the next domain 32 is located after some number of increments, I, after the space, S, where I is the size of each increment. In FIG. 6, there are four possible positions, and thus a domain located at any one of those four possible locations contains two bits of information. For example, a '00' may be stored if the domain 32 is located at the position indicated by the solid line, a "01" may be stored if the domain 32 is located at the next position to the right, a "11" may be stored if the domain 32 is located at the next position to the right, and a "10" may be stored if the domain 32 is located at the position indicated by the last dashed line. The leading edge of each domain is thus located at a position M+S+(symbol value)*I from the leading edge of the last domain, where (symbol value) is the integer 0, 1, 2, or 3.

Figure 7:
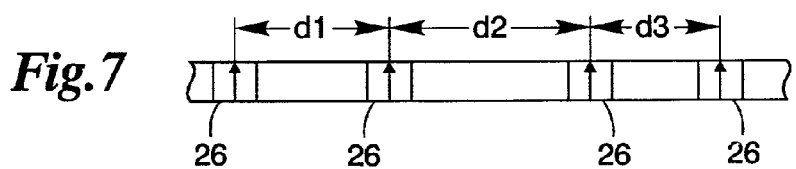
FIG. 7 illustrates information stored in the recording medium according to the present invention.

As shown in FIG. 7, each domain 26 is recorded in the storage layer 13 at a position after the last domain determined by the information to be stored. Thus the positions, i.e. the distances d1,d2,d3, . . . , dn are determined by the information in a write operation and represent the information in a read operation.

A special mark could be used to designate the start of a block of data, which may then be followed with calibration and header information. The special mark could be a space between domains that is twice as large as any other space on the disk. This "start bit" could be followed by two domains of minimum and maximum sized spacing used for timing calibration, and then a fixed number of bits used to identify the track and block. In addition, error correction may be include. Those of ordinary skill in the art will recognize that many other types of start blocks and "headers" may be implemented without departing from the spirit and scope of this invention. Additionally, the invention is not limited to two bits per domain such that other types of encoding may be implemented. Other write schemes, such as where the position of the domain is determined by reference to a fixed position, such as a start block, may also be used.

Figure 8:
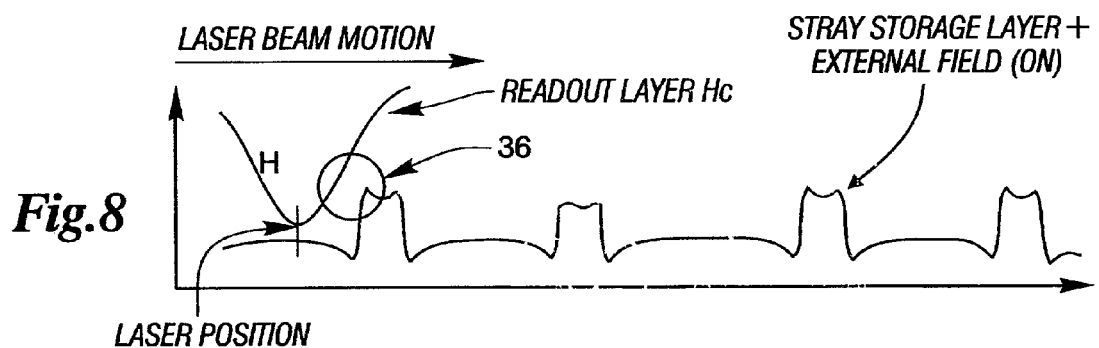
FIG. 8 illustrates a coercivity profile and the external field plus the stray field according to the present invention.

Turning now to FIG. 8, to generate the readout signal, the laser beam 17 sweeps across the medium 12, heating the readout layer 14 as it moves along. The heated portion of the readout layer 14 has a lower coercivity, $H_c$, than the non-heated portion of the readout layer 14, so the low point of the readout layer $H_c$ "sweeps" across the medium 12 with the laser beam 17. As the laser beam is sweeping across the medium 12, the external field produced by coil 20 is raised before the laser beam 17 passes over each domain 26. Alternatively, and in conjunction with FIG. 6, the external field is raised at or before the first possible position the domain 32 can occupy, and remains raised until all possible positions are swept or a domain is located. As the laser beam 17 passes onto each domain 26, nucleation takes place when the stray field plus the external field are sufficient to overcome the coercivity of the readout layer 14. That may be conceptualized as a "collision" of the coercivity profile and the combined stray plus external fields. The oval 36 in FIG. 8 shows the moment in time just prior to the collision. At the time of the collision, the magnetic orientation of the readout layer changes when a domain 26 is present so that the magnetic orientation of the readout layer 14 is the same as the magnetic orientation of the underlying storage layer 13. After nucleation, the expansion process begins and the readout signal increases.

Figure 9A:
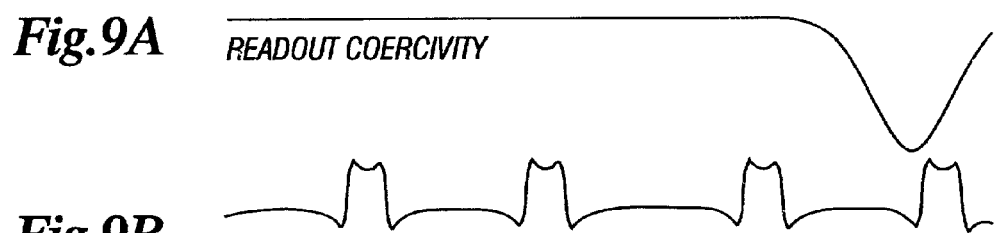
FIGS. 9A–9D illustrates a readout scheme according to the present invention.
Figure 9B:
Figure 9C:
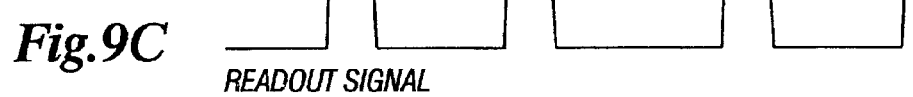
Figure 9D:
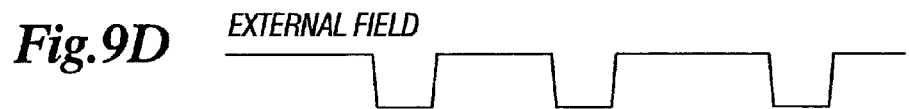

FIGS. 9A through 9D illustrate the individual profiles and signals discussed above in conjunction with FIG. 8. The expansion in DPD-MAMMOS is triggered by the collision of the laser induced coercivity profile of FIG. 9A with the combined stray field and external field of FIG. 9B. Although both of these curves have a flat top, the walls or edges of the curves are steep, and more precisely defined, making the spatial resolution high. After the collision takes place, the external field shown in FIG. 9D is switched negative after a brief delay, to collapse the domain in the readout layer. Then it is switched positive again when the laser profile has passed a "safe" distance over the domain.

The readout signal of FIG. 9C rises just as the coercivity profile of FIG. 9A collides with the combined field of FIG. 9B. At the moment in time shown in the figure, this process has just occurred on the last domain written in the media. It can be seen that the readout signal has just increased. Looking at the readout signal sensed thus far, the information is clearly read from the distance between peaks. After each peak, the external field is left on for a predetermined time, and then reversed to collapse the domain in the readout layer. When the coercivity profile is sufficiently far from the domain in the readout layer to prevent overlapping with the same domain, it is switched back.

DPD-MAMMOS has several advantages over current MAMMOS systems. The first of these is that it has potential for achieving a higher storage density. Although the ultimate density will be determined by the resolution available to the readout technique and the resolution of the storage layer, it can be seen how this number could be high. To get an idea of the density of DPD-MAMMOS, we first need to know the spacing between domains. This can be estimated by taking a conventional MAMMOS system and removing three out of four bits to make room for the external field increasing before each domain to produce the collision. If three out of four bits are removed, then we encode the new domain to one of four positions to arrive back at the original density. In a system with 100 nm domains and 100 nm spaces this corresponds to distinguishing 50 nm features, which is an obtainable value. Anything beyond this will provide a higher density.

In addition to resolution problems, current MAMMOS suffers from small margins on laser power and field. DPD-MAMMOS, however, is independent of laser power and media property fluctuations. Because data in the new technique is stored in the position, or relative timing between domains, the achievable density (spatial resolution of domains) is immune to slow fluctuations in laser power, media properties, and focus. As an example, if the laser power were to increase by some small amount, the media temperature would increase, lowering the coercivity curve (FIG. 9A). In traditional MAMMOS, this would result in a larger detection tip area, and thus a decreased resolution, and possibly read errors. In DPD-MAMMOS, the detection time of the first domain or symbol would occur slightly earlier. Similarly, subsequent domains or symbols would also be detected slightly earlier, thus leaving the time difference unchanged. Because information is stored in the difference, the ability to read the data remains unchanged.

Figure 10:
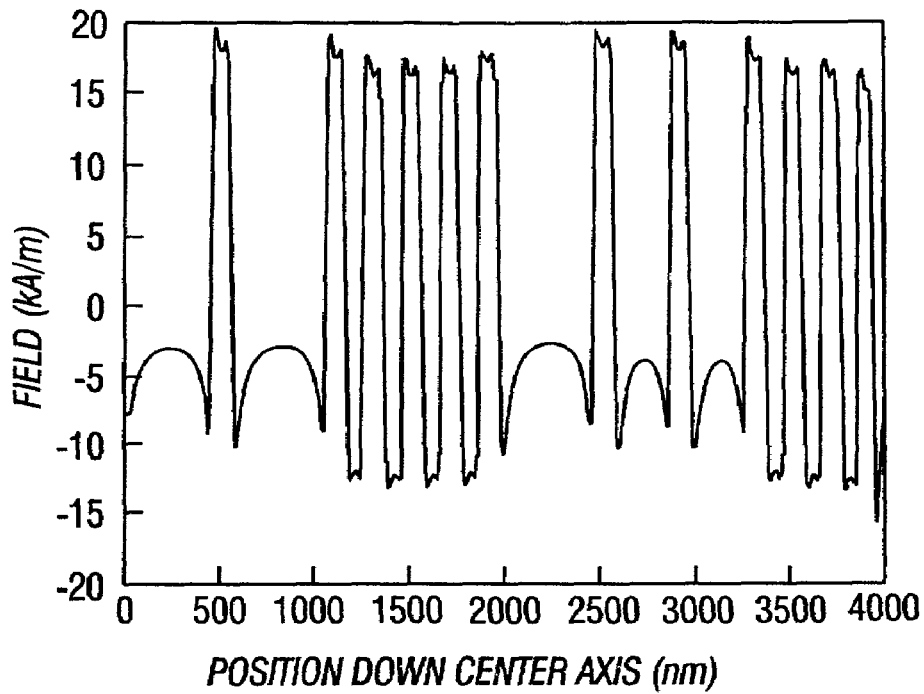
FIGS. 10 and 11 are graphs illustrating the neighborhood effect.
Figure 11:
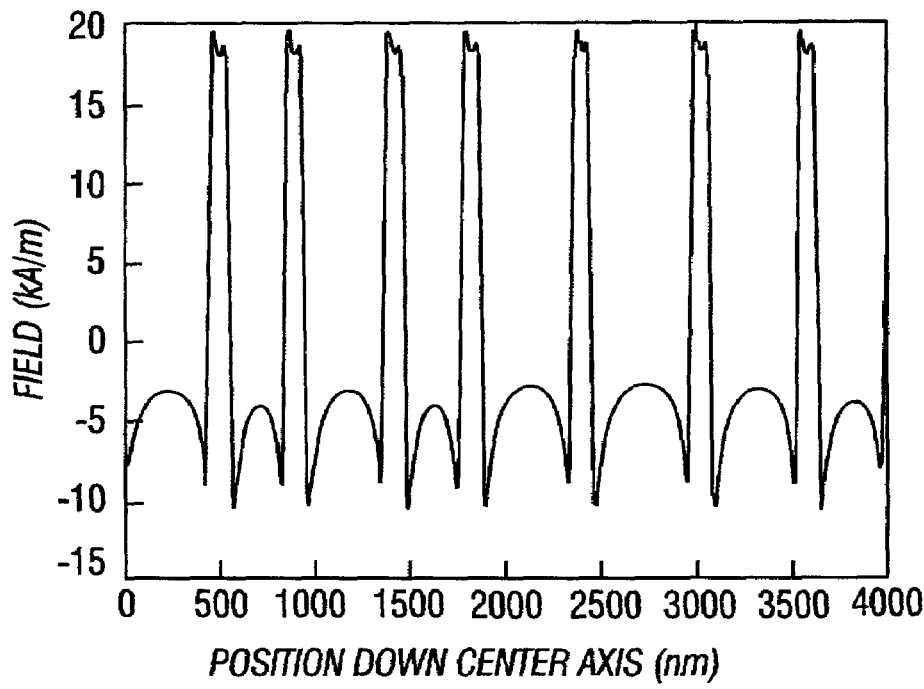

The margin problems are exaggerated by the neighborhood effect. The neighborhood effect is a shifting in the magnitude of the external magnetic field emanating from a domain caused by the fields from neighboring domains. Using DPD-MAMMOS should reduce the neighborhood problem because domains have a larger separation. FIGS. 10 and 11 are simulation results, for the Z component, from recording crescent domains of the same size for conventional and DPD-MAMMOS encoding, respectively. As can be seen from the plot of FIG. 10, the stray field magnitude from the domains is not uniform and will shift slightly depending on if there are other domains in the "neighborhood" of the domain. The higher the density, the more packed the domains become, and the stronger this effect is. DPD-MAMMOS partially solves that problem by moving domains further apart as seen in FIG. 11.

Another advantage of DPD-MAMMOS is that timing is part of the detection scheme, and there is no need for a separate timing recovery mechanism. In current MAMMOS research, recovering timing information for synchronizing the external field to the domain locations is a problem still being investigated. See Immink et al., "Signal Processing for the MAMMOS Channel" MORIS 2002 Conference Digest, Paper We-M2, pages 201–203 (May 5, 2002), which is hereby incorporated by reference. In DPD-MAMMOS, the readout signal obtained from the reading of domains provides the timing information needed for controlling the application of the external field.

Figure 12A:
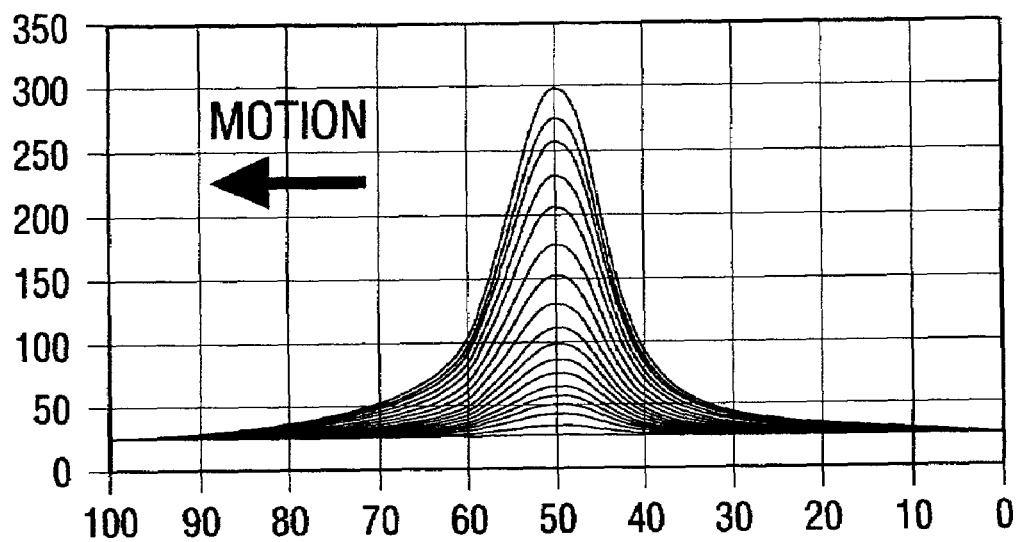
FIGS. 12A and 12B are calculations of the thermal profile created by the laser beam showing how the profile changes with an increase in velocity.
Figure 12B:
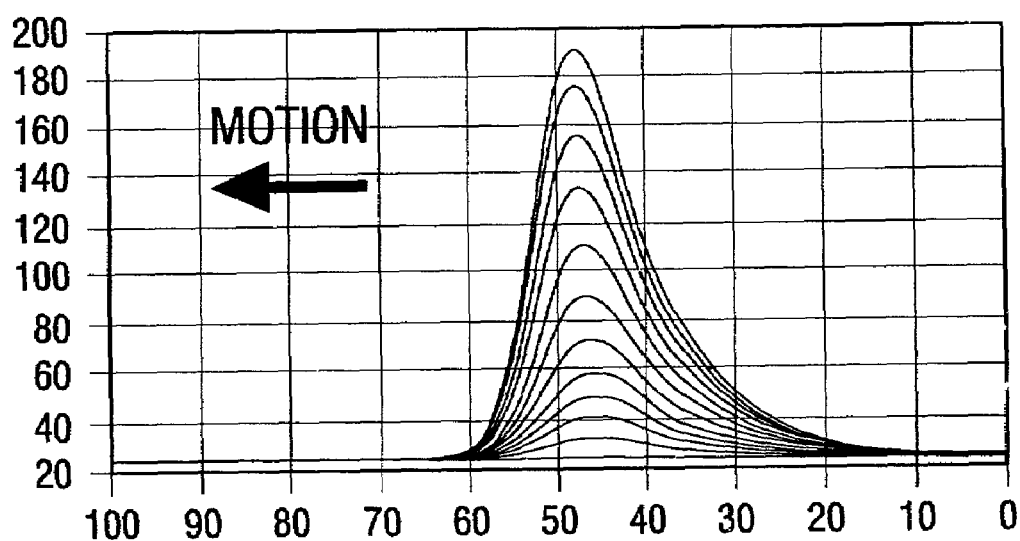

Finally, DPD-MAMMOS may be very attractive for high data rate applications. Because there are not as many expansions/collapses per bits read, there is less of a limitation imposed by the expansion/collapse speed and external coil response time. Further, in DPD-MAMMOS, the achievable readout resolution is partly determined by the steepness of the coercivity profile and not the width. When the media velocity increases, the shape of thermal profile in the media is altered. As devices approach higher data rates and higher velocities, this becomes an advantage. FIGS. 12A and 12B show calculations of thermal profiles on an MO recording medium at velocities of 0.003 m/s and 10 m/s, respectively. As the speed of the media increases, the width of the profile slightly narrows and the slope of the leading edge becomes significantly steeper.

While the present invention has been described in conjunction with preferred embodiments thereof, those of ordinary skill in the art will recognize that many modifications and variations are possible. The present invention is intended to be limited only by the following claims and not the preceding description.

What is claimed is:

1. A method of storing information in a MAMMOS type storage media, comprising:
   recording magnetic domains such that the spacing between the domains represents the stored information, and wherein said spacing comprises a first length related to a power margin of the system and a second length related to the stored information.

2. The method of claim 1 wherein said domains are recorded to minimize a neighborhood effect.

3. A method of storing information in a MAMMOS type storage media, comprising:
   recording magnetic domains such that a difference in the position between a subsequent domain and a previous domain represents the stored information, and wherein said difference in position comprises a first length related to a power margin of the system and a second length related to the stored information.

4. The method of claim 3 wherein said domains are recorded to minimize a neighborhood effect.

5. A method of reading information from a medium consisting of a storage layer and a readout layer, wherein the magnetic properties of the two layers are selected such that a magnetic field created by data in the storage layer is used to control a magnetic orientation of the readout layer, said method comprising:
   sweeping said medium with a laser to selectively heat portions of said medium;
   applying an external magnetic field to said medium;
   detecting when the magnetic orientation of the readout layer assumes the magnetic orientation of a magnetic domain in the storage layer; and
   extracting information from a distance between magnetic domains in the storage layer, and wherein said distance between magnetic domains comprises a first length related to a power margin of the system and a second length related to the stored information.

6. The method of claim 5 additionally comprising using the detected magnetic domains to apply the external magnetic field.

7. The method of claim 1 wherein said second length has a plurality of possible values, each value representing one of a plurality of multi-bit combinations.

8. A method of storing information in a MAMMOS type storage media, comprising:
   recording magnetic domains such that the spacing between the domains represents the stored information, and wherein a leading edge of each domain is located at a spacing determined by:
   M+S+(symbol value)*I where
   M is the length of a written domain;
   S is related to a power margin of the system;
   symbol value=an integer; and
   I=length of each increment.

9. The method of claim 3 wherein said second length has a plurality of possible values, each value representing one of a plurality of multi-bit combinations.

10. A method of storing information in a MAMMOS type storage media, comprising:
    recording magnetic domains such that a difference in the position between a subsequent domain and a previous domain represents the stored information, and wherein a leading edge of each domain is located at a spacing determined by:
    M+S+(symbol value)*I where
    M is the length of a written domain;
    S is related to a power margin of the system;
    symbol value=an integer; and
    I=length of each increment.

11. The method of claim 3 wherein said difference in position represents one of start information, calibration information, header information, or encoded information.

12. The method of claim 5 wherein said second length has one of four possible values, each value representing one of a plurality of multi-bit combinations.

13. A method of reading information from a medium consisting of a storage layer and a readout layer, wherein the magnetic properties of the two layers are selected such that a magnetic field created by data in the storage layer is used to control a magnetic orientation of the readout layer, said method comprising:
    sweeping said medium with a laser to selectively heat portions of said medium;
    applying an external magnetic field to said medium;
    detecting when the magnetic orientation of the readout layer assumes the magnetic orientation of a magnetic domain in the storage layer; and
    extracting information from a distance between magnetic domains in the storage layer, and wherein a leading edge of each domain is located at a distance determined by:
    M+S+(symbol value)*I where
    M is the length of a written domain;
    S is related to a power margin of the system;
    symbol value=an integer; and
    I=length of each increment.

14. The method of claim 5 wherein said distance between magnetic domains represents one of start information, calibration information, header information, or encoded information.

* * * * *